(12) United States Patent
Nakaoka et al.

(10) Patent No.: US 7,720,051 B2
(45) Date of Patent: May 18, 2010

(54) IP TELEPHONE TERMINAL DEVICE

(75) Inventors: Kunio Nakaoka, Tokyo (JP); Hiroaki Sakai, Tokyo (JP); Yoshinari Sugegaya, Tokyo (JP); Masashi Mori, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 469 days.

(21) Appl. No.: 11/485,444

(22) Filed: Jul. 13, 2006

(65) Prior Publication Data
US 2007/0223461 A1 Sep. 27, 2007

(30) Foreign Application Priority Data
Mar. 23, 2006 (JP) ............................. 2006-081603

(51) Int. Cl.
*H04L 12/66* (2006.01)
(52) U.S. Cl. .................. 370/352; 379/202.01; 709/220; 709/250
(58) Field of Classification Search ................ 370/352, 370/351, 392, 537, 353, 354, 355, 356; 455/412.2; 709/220, 250; 379/202.01
See application file for complete search history.

(56) References Cited

U.S. PATENT DOCUMENTS

| 2004/0097188 | A1* | 5/2004 | Tanimoto | 455/3.06 |
| 2005/0100002 | A1* | 5/2005 | Oouchi et al. | 370/352 |
| 2006/0013195 | A1* | 1/2006 | Son et al. | 370/352 |
| 2007/0127441 | A1* | 6/2007 | Lin et al. | 370/352 |
| 2007/0223447 | A1* | 9/2007 | Saito et al. | 370/351 |

FOREIGN PATENT DOCUMENTS

| JP | 2005-252809 | 9/2005 |
| JP | 2005311577 A | * 11/2005 |

* cited by examiner

*Primary Examiner*—Fan Tsang
*Assistant Examiner*—Simon King
(74) *Attorney, Agent, or Firm*—Buchanan Ingersoll & Rooney PC

(57) ABSTRACT

An internet protocol (IP) telephone device includes a plurality of IP modules and an IP-module selecting unit that selects an IP module based on a call command received from an opponent telephone terminal device.

3 Claims, 5 Drawing Sheets

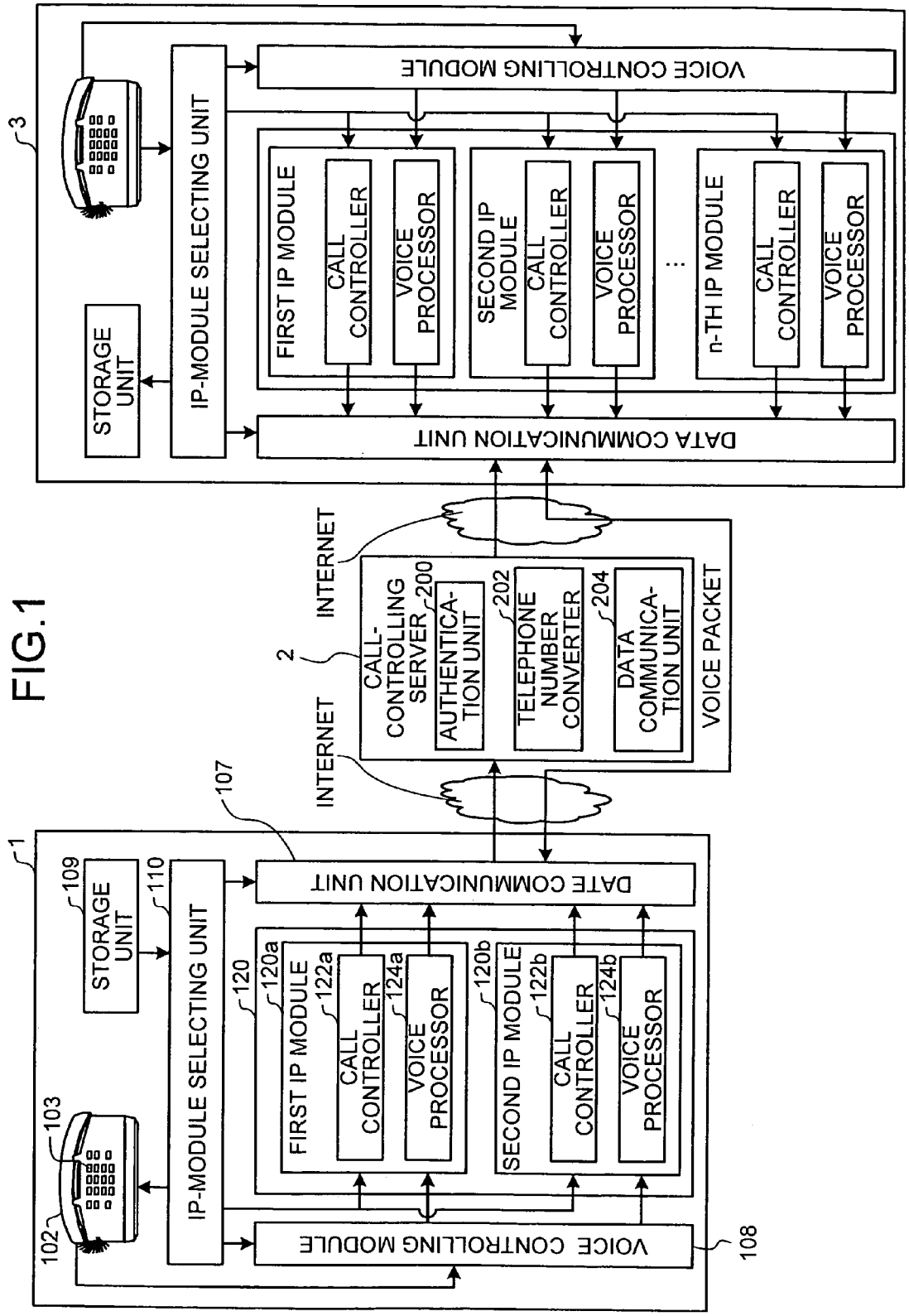

IP TELEPHONE TERMINAL DEVICE

BACKGROUND OF THE INVENTION

1. Field of the Invention

The present invention generally relates to internet protocol (IP) telephones, and specifically relates to realizing various functions on IP telephones.

2. Description of the Related Art

In conventional internet protocol (IP) telephones, a transferring function, a caller ID function, and the like have been realized by using a session initiation protocol (SIP) server.

Japanese Patent Laid-Open Publication No. 2005-252809 discloses a technology that can transfer telephone calls without using the SIP server. However, according to the disclosed technology, calls can be transferred only from a telephone set that has a dedicated call-transferring function and the call can be transferred only to pre-registered telephone numbers. As a result, the conventional technology can only be used with IP telephone terminals in an internal-telephone line system, moreover, there is a need to set extension numbers and the like in advance.

Thus, there is a need of a technology that allows realization of various functions on IP telephones easily and with simpler configuration.

SUMMARY OF THE INVENTION

It is an object of the present invention to at least partially solve the problems in the conventional technology.

According to an aspect of the present invention, an IP telephone terminal device includes a voice input/output unit configured to receive input of voice and to output voice; a plurality of internet protocol (IP) telephone modules each assigned with an IP telephone number; an IP-module selecting unit that selects an IP module based on an IP telephone number included in a call command received from at least one opponent telephone terminal device and connects selected IP module to the voice input/output unit; and a voice controlling unit that controls input/output of voice between the voice input/output unit and the opponent telephone terminal device through the selected IP module.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic of an internet communication system according to an embodiment of the present invention;

DETAILED DESCRIPTION OF THE PREFERRED EMBODIMENTS

Figure 2A:
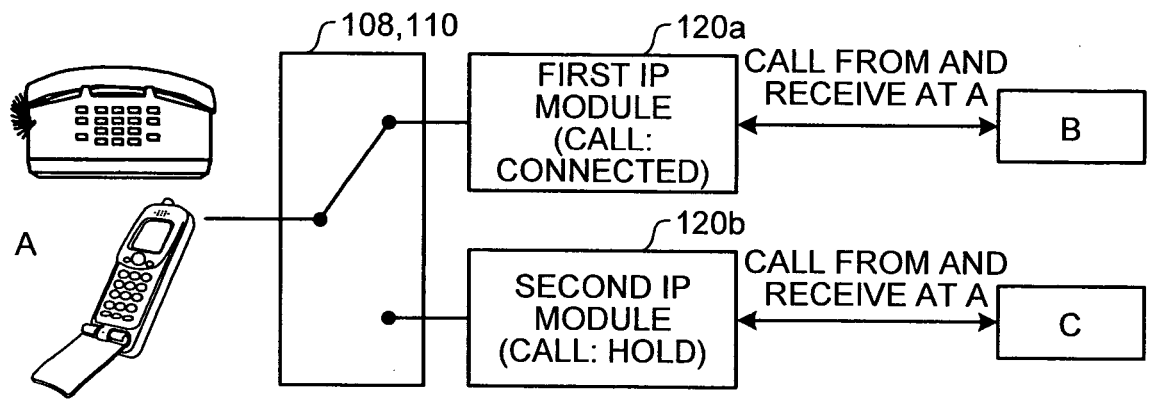
FIG. 2A is a schematic for explaining a holding function of an internet protocol (IP) telephone terminal device shown in FIG. 1.

Exemplary embodiments of the present invention will be explained below in detail while referring to the accompanying drawings; however, the present invention is not limited to the embodiments.

FIG. 1 is a schematic of an internet communication system according to an embodiment of the present invention. The internet communication system includes an internet protocol (IP) telephone terminal device 1 that includes a voice input/output unit 102, a dialing unit 103, a first IP module 120a, a second IP module 120b, a data communication unit 107, a voice controlling module 108, an IP-module selecting unit 110, and a storage unit 109. The IP telephone terminal device 1 is connected to a call-controlling server 2 via the Internet. The IP telephone terminal device 1 can make a call to another IP telephone terminal device 3 or to another ordinary digital or analogue telephone terminal device (not shown) via the call-controlling server 2.

The voice input/output unit 102 and the dialing unit 103 correspond to a receiver and a dialing unit of a general telephone device respectively. An IP module 120 performs a process corresponding to a general IP telephone. In the example shown in FIG. 1, the IP telephone terminal device 1 includes two IP modules 120: the first IP module 120a and the second IP module 120b, however, the IP telephone terminal device 1 can include n (where n is a positive integer equal to or more than 2) IP modules.

The first IP module 120a includes a first call controller 122a and a first voice processor 124a, and the second IP module 120b includes a second call controller 122b and a second voice processor 124b. The first call controller 122a and the second call controller 122b control calls based on IP telephony, while the first voice processor 124a and the second voice processor 124b perform voice processing operation based on IP telephony.

The data communication unit 107 outputs data from the first IP module 120a and the second IP module 120b to the Internet. Specifically, the data communication unit 107 outputs data from the first call controller 122a, the second call controller 122b, the first voice processor 124a, and the second voice processor 124b to the Internet. The voice controlling module 108 controls input/output of voice to/from the first IP module 120a and the second IP module 120b. The IP-module selecting unit 110 controls the first IP module 120a, the second IP module 120b, the data communication unit 107, and the voice controlling module 108. The storage unit 109 stores therein telephone numbers, group setting, and the like. For example, the storage unit 109 stores therein IP telephone numbers assigned to each of the first IP module 120a and the second IP module 120b.

An IP telephone number is assigned to each of the first IP module 120a and the second IP module 120b. The IP telephone numbers assigned to each of the first IP module 120a and the second IP module 120b can be unique or can be identical.

The call-controlling server 2 includes an authentication unit 200, a telephone number converter 202, and a data communication unit 204. The authentication unit 200 authenticates the IP telephone terminal device that makes a call to the IP telephone terminal device 1. The telephone number converter 202 converts an IP telephone number specified in a call command to an IP address and an IP address to an IP telephone number. The data communication unit 204 performs routing.

Figure 3A:
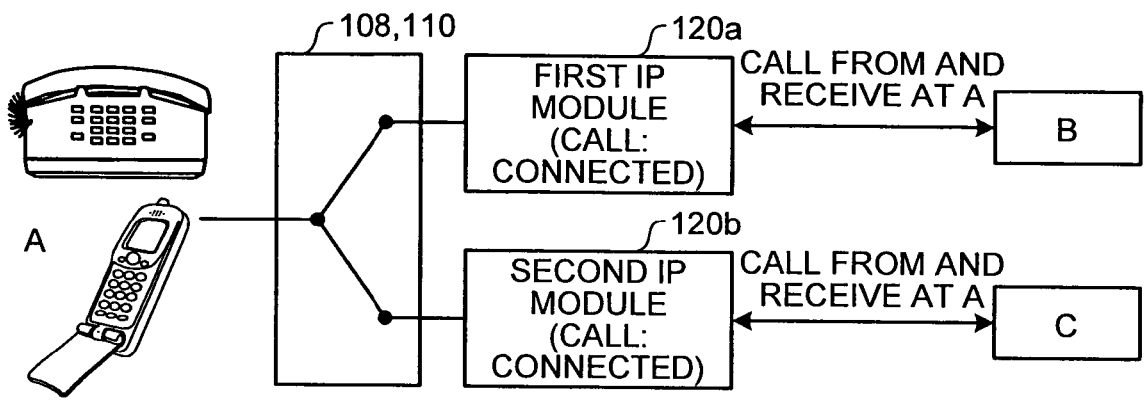
FIG. 3A is a schematic for explaining a group-call function of the IP telephone terminal device.

FIGS. 2A and 3A are for explaining a case where an identical IP telephone number A is assigned to both the first IP module 120a and the second IP module 120b. In the examples shown in FIGS. 2A and 3B, the first IP module 120a and the second IP module 120b receive calls from two different IP telephone terminal devices: a first IP telephone terminal device corresponding to an IP telephone number B and a second IP telephone terminal corresponding to another IP telephone number C.

Figure 2B:
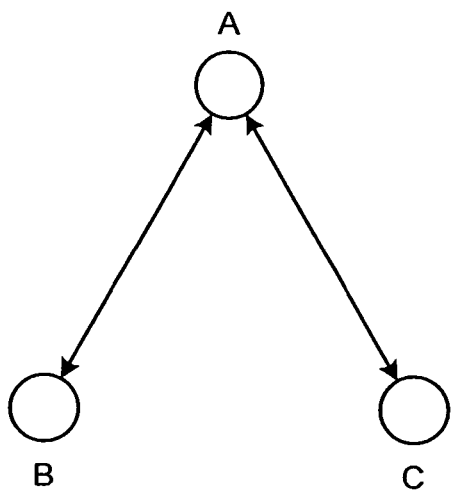
FIG. 2B is another schematic for explaining the holding function of the IP telephone terminal device.

In the example shown in FIG. 2A, the IP-module selecting unit 110 causes the voice controlling module 108 to switch input/output of voice to/from the first IP module 120a and the second IP module 120b while retaining the calls. In this manner, as shown in FIG. 2B, the IP telephone terminal device 1 realizes a holding function between the telephone terminal device 1 and the two IP telephone terminal devices corresponding to the IP telephone numbers B and C respectively.

Figure 3B:
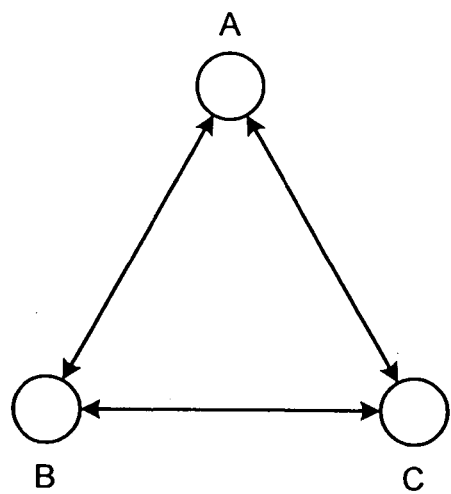
FIG. 3B is another schematic for explaining the group-call function of the IP telephone terminal device.

In the example shown in FIG. 3A, the IP-module selecting unit 110 inputs/outputs voice of the first IP module 120a and the second IP module 120b to/from the voice controlling module 108 at the same time. In this manner, as shown in FIG. 3B, with the IP telephone terminal device 1 having two IP modules, it becomes possible to realize a group call among three IP telephone terminal devices corresponding to the IP telephone numbers A, B, and C. In other words, if the IP telephone terminal device 1 includes n IP modules, a group call can be realized among n+1 IP telephone terminal devices.

It is possible to group the IP modules of the IP telephone terminal device 1. If the IP telephone terminal device 1 includes, for example, four IP modules, they can be divided into two groups, each containing two IP modules. If the IP telephone terminal device 1 includes n IP modules, they can be divided into n/2 groups each containing two IP modules when n is even, and they can be divided into (n−1)/2 groups each containing two IP modules and a group containing one IP module when n is odd. Each group can include more than two IP modules.

Figure 4A:
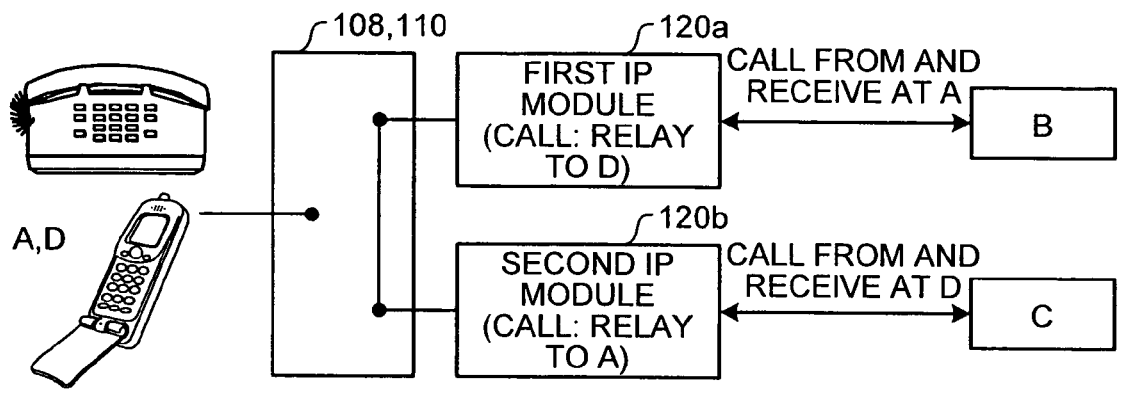
FIG. 4A is a schematic for explaining a relaying function of the IP telephone terminal device.
Figure 4B:
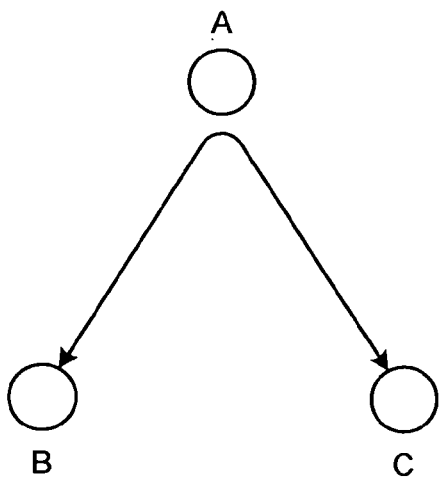
FIG. 4B is another schematic for explaining the relaying function of the IP telephone terminal device.

FIG. 4A is for explaining a case where the IP telephone number A is assigned to the first IP module 120a, and another IP telephone number D is assigned to the second IP module 120b. In the example shown in FIG. 4A, the first IP telephone terminal device corresponding to the IP telephone number B makes a call to the IP telephone number A while the second. IP telephone terminal device corresponding to the IP telephone number C makes a call to the IP telephone number D. In this case, the IP-module selecting unit 110 causes the voice controlling module 108 to directly connect the voice input and output between the first IP module 120a and the second IP module 120b without connecting to the voice input-output unit 102. At this time, the first call controller 122a in the first IP module 120a relays the IP telephone number A to the IP telephone number D. Similarly, the second call controller 122b in the second IP module 120b relays the IP telephone number D to the IP telephone number A. As a result, as shown in FIG. 4B, the IP telephone terminal devices corresponding to the IP telephone numbers B and C can communicate with each other via the IP telephone terminal device 1 without communicating with the IP telephone terminal device 1.

Figure 5:
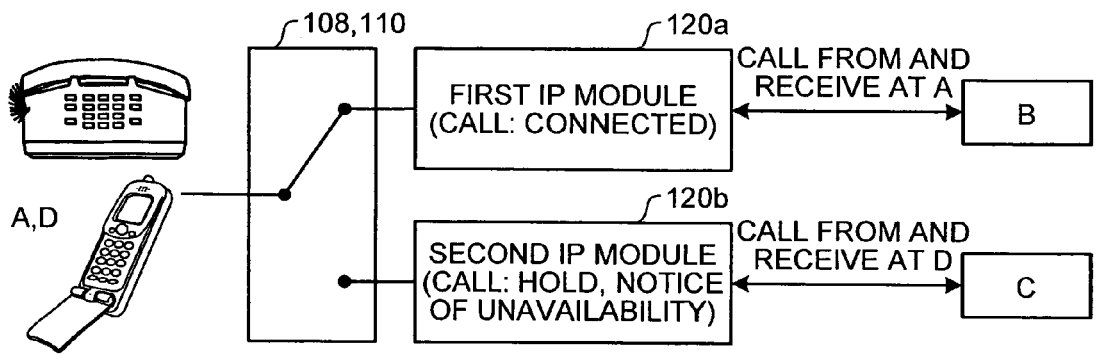
FIG. 5 is an example of setting a unique IP telephone number to each of two IP modules in the IP telephone terminal device.

FIG. 5 is also for explaining a case where the IP telephone number A is assigned to the first IP module 120a, and another IP telephone number D is assigned to the second IP module 120b. In this case, by using the holding function described above it is possible to use a plurality of IP telephone numbers on a single IP telephone terminal device 1 depending on the intended purpose.

For example, the user of the IP telephone terminal device 1 can use the IP telephone number A as a business telephone number and the IP telephone number D as a private telephone number. The user can also use different IP telephone numbers for different groups of friends. In the example shown in FIG. 5, the first call controller 122a in the first IP module 120a is being used for conversation with the first IP telephone terminal device corresponding to the IP telephone number B, and the second call controller 122b in the second IP module 120b is put on hold and the second call controller 122b notifies the unavailability of the user to the second IP telephone terminal device corresponding to the IP telephone number C.

Figure 6:
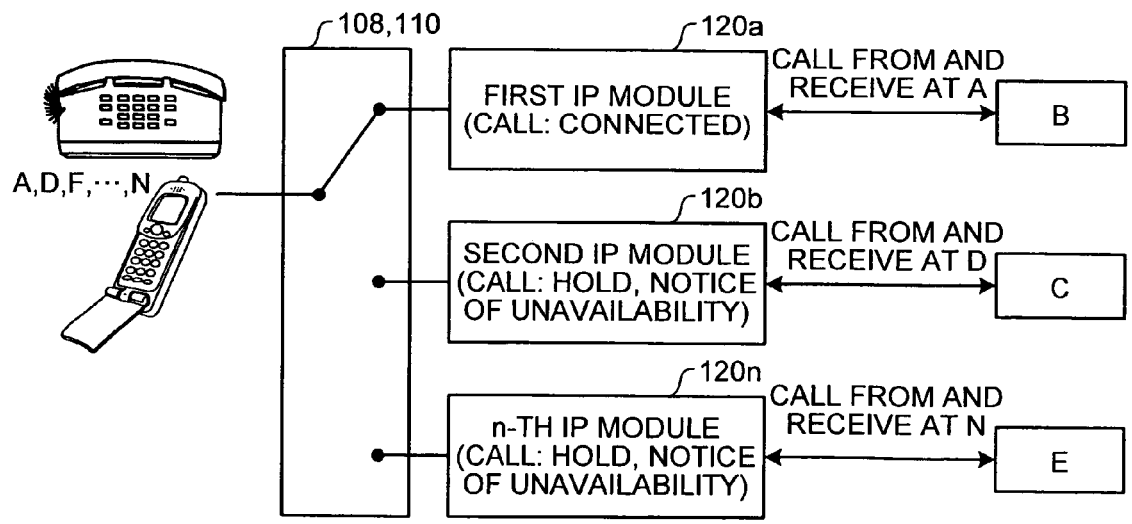
FIG. 6 is an example of setting a unique IP telephone number to each of n IP modules in the IP telephone terminal device.

FIG. 6 is for explaining a case where n unique IP telephone numbers A, D, F, . . . , N are assigned to n IP modules 120. In this case, as with the example shown in FIG. 5, when, for example, the first call controller 122a in the first IP module 120a is being used for conversation with the first IP telephone terminal device corresponding to the IP telephone number B, each of the call controller 122 in all the other IP modules 120 is put on hold and each of the call controller 122 notifies unavailability of the user to each of the corresponding IP telephone terminal devices.

According to an aspect of the present invention, the storage unit stores therein IP telephone numbers assigned to the IP modules respectively; the IP-module selecting unit selects an IP module corresponding to the assigned IP telephone number stored in the storage unit based on a call command to the IP module and connects the IP module to the voice input/output unit; and the voice controlling module inputs/outputs voice between the voice input/output unit and another telephone terminal device through the IP module selected by the IP-module selecting unit. As a result, various functions, such as a holding function, a call transferring function, can be realized easily, with simple configuration, and without using an SIP server.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:
1. An IP telephone terminal device comprising:
  a voice input/output unit configured to receive input of voice and to output voice;
  a plurality of internet protocol (IP) telephone modules, each IP telephone module being capable of an independent IP telephone process based on a respectively assigned IP telephone number;
  an IP-module selecting unit that selects at least one of the plurality of IP telephone modules based on an IP telephone number included in a call command received from at least one opponent telephone terminal device and connects the selected at least one of the plurality of IP telephone modules to the voice input/output unit;
  a voice controlling unit that controls input/output of voice between the voice input/output unit and the at least one opponent telephone terminal device through the selected at least one of the plurality of IP telephone modules; and
  a storage unit that stores therein identification information for identifying IP telephone modules that belong to a group of at least three parties communicating with one another among the IP telephone modules, wherein each of the IP telephone modules that belongs to a certain group communicate with a different opponent telephone terminal device, and the voice controlling unit inputs/outputs voice between the voice input/output unit of each of the IP telephone modules and corresponding opponent telephone terminal device.

2. The IP telephone terminal device according to claim 1, wherein the IP telephone modules includes a first IP module assigned with a first IP telephone number to communicate with a first opponent telephone terminal device; and a second IP module assigned with a second IP telephone number to communicate with a second opponent telephone terminal device, and the voice controlling unit switches input/output of voice to/from the voice input/output unit between the first IP module and the second IP module.

3. The IP telephone terminal device according to claim 1, wherein the IP telephone modules includes a first IP module assigned with a first IP telephone number to communicate with a first opponent telephone terminal device; and a second IP module assigned with a second IP telephone number to communicate with a second opponent telephone terminal device, and the voice controlling unit inputs/outputs voice between the first IP module and the second IP module.

* * * * *